United States Patent [19]

Brunnmueller et al.

[11] 3,896,087
[45] July 22, 1975

[54] MANUFACTURE OF STABLE UREA/FORMALDEHYDE RESINS IN A THREE STAGE REACTION

[75] Inventors: Friedrich Brunnmueller; Helmut Henkel; Johann Lenz, all of Ludwigshafen, Germany

[73] Assignee: Badische Anilin- & Soda-Fabrik Aktiengesellschaft, Ludwigshafen, Rhine, Germany

[22] Filed: July 12, 1972

[21] Appl. No.: 271,054

[30] Foreign Application Priority Data
July 16, 1971   Germany............................ 2135738

[52] U.S. Cl................ 260/69 R; 161/261; 161/263; 260/29.4 R; 260/840; 260/849
[51] Int. Cl............................................. C08g 9/10

[58] Field of Search .................................. 260/69 R

[56] References Cited
UNITED STATES PATENTS

| | | | |
|---|---|---|---|
| 2,625,524 | 1/1953 | Kvalnes ............................ | 260/69 R |
| 2,729,611 | 1/1956 | Chesley et al. .................. | 260/69 X |

*Primary Examiner*—Howard E. Schain
*Attorney, Agent, or Firm*—Johnston, Keil, Thompson & Shurtleff

[57] ABSTRACT

Manufacture of impregnating urea/formaldehyde resins in which, in order to achieve particularly high rates of impregnation, urea and formaldehyde are condensed in acid solution until water-incompatibility commences, whereupon the mixture is treated with formaldehyde followed by urea.

2 Claims, No Drawings

MANUFACTURE OF STABLE UREA/FORMALDEHYDE RESINS IN A THREE STAGE REACTION

Impregnating resins based on urea/formaldehyde condensates are well known. They constitute the major proportion of amino binders for the surface treatment of wood and wood materials and for related techniques.

Impregnating amino resins are readily available in large quantities, are virtually colorless and may be processed to durable materials.

While the properties of the cured binder may be influenced for example by a variety of additives, the properties of the dissolved resins, which determine the processing properties of the actual resin solutions, are in constant need of improvement.

It is particularly desirable to achieve high impregnating rates and a high degree of stability on storage of the resins or their solutions. It has been found, however, that an improvement in one of these properties usually leads to deterioration in the other property. For example, optimum impregnating properties are found to occur when the impregnating resin solutions have a high proportion of low molecular weight condensates. Such resin solutions are primarily obtained by condensation under alkaline or weakly acidic conditions; however, they are not sufficiently stable for practical purposes.

If amino resin solutions are condensed under acidic conditions to such an extent that they are adequately stable, the suitability of the resultant products for use as impregnating resins is limited due to their high viscosity. Resins produced under alkaline conditions are distinguished by good impregnating properties due to their high proportion of methylol compounds, but the solubility of the methylol compounds contained in the resin is relatively low, with the result that impregnating resin solutions which have been condensed under alkaline conditions show supersaturation of the methylol compounds when the resin concentration is as low as from 40 to 60% and a solid sediment thus occurs after a period.

In particular, the processes leading to the formation of a sediment are often accelerated to a marked extent following the addition of emulsifiers, other polymer dispersions and curing substances, i.e. the pot-life of the resins is shortened considerably. At the same time, the viscosity increases steadily so that when papers are impregnated the impregnating resin is unevenly distributed over the paper base, since it is necessary for the resin solution to a have a low viscosity for a considerable period in order to penetrate the cellular voids of the paper fibers.

It is an object of the invention to provide impregnating urea/formaldehyde resins, solutions of which rapidly penetrate the voids of fibers without the binder portion remaining on the surface of the fiber, said solutions also showing good stability on storage. Although a number of proposals for improving these properties are known which involve a modification of the condensates, for example by adding substances capable of condensing with urea and formaldehyde, such methods are generally not economical, since urea and formaldehyde are extremely cheapmass-produced substances which can hardly be economically replaced, not even partially.

We have found that stable resins based on condensates of urea and formaldehyde and having excellent impregnating properties may be obtained by preparing solutions of relatively high molecular weight resins and subjecting them to specific after-treatment with formaldehyde.

Thus the invention relates to a process for the manufacture of impregnating urea/formaldehyde resins, particularly for use in the surface-treatment of wood materials, which comprises the following steps:

a. condensing urea and formaldehyde in aqueous acid solution in a molar ratio of from 1:1.5 to 1:2.5 in known manner at least to such an extent that a sample of the condensate solution causes turbidity when added dropwise to cold 50% magnesium sulfate solution, but not to an extent exceeding the point at which the resin still remains soluble in the solution at temperatures above 60°C;

b. adding at least 0.2 moles of formaldehyde per mole of urea to obtain a molar ratio of urea to formaldehyde of from 1:2.5 to 1:4 followed by condensing at a temperature of between 40°C and the boiling point of the solution and at a pH of between 3.5 and 9 until the resin solution is capable of being diluted with at least 20 volumes of water at room temperature to form a clear solution; and c. adding urea if necessary to give a final molar ratio of urea to formaldehyde of from 1:1.5 to 1:2.5 and effecting postcondensation of the mixture at a pH of between 4.0 and 6.5 until all free urea has disappeared.

It would seem that the success of the measures of the invention may be due to the avoidance, in our process, of the formation of low molecular weight methylol compounds of urea which form unstable supersaturated solutions and tend to condense further.

The after-treatment ("condensation") with formaldehyde as described under (b) above may be carried out at pH's between 3.5 and 9. Advantageously, said after-treatment is carried out at pH's between 4.5 and 6.5. If it is carried out at pH's below 4.5, the resins produced show marked deterioration in their impregnation properties, whilst resins which have been treated with formaldehyde at pH's above 6.5 show a slower rate of curing during condensation.

After-treatment with formaldehyde may be carried out for example at temperatures between 40°C and the boiling point of the condensation solution under atmospheric pressure (approx. 95°C). However, it is advantageous to carry out this after-treatment at temperatures between 60° and 95°C. At temperatures below 60°C the solutions of condensate tend to show premature precipitation particularly when they contain major amounts of high molecular weight components.

The molar ratio of urea to formaldehyde in the resins obtained under (a) in preparation for after-treatment with formaldehyde may be between 1:1.5 and 1:2.5. These components are usually condensed under acid conditions, i.e. at pH's below 7 and in particular from pH 4.5 to pH 6.5. The resin content of the solutions, which may be determined as the solids content for example, generally lies between 40 and 70% by weight.

The resin solutions required for after-treatment in step (b) may be prepared shortly before such treatment, or use may be made of commercially available resin solutions of the invention, or such solutions may be prepared by dissolving commercially available resin powders and then used, without departing from the spirit of the invention.

According to the invention, the condensation of the resins before after-treatment with formaldehyde should be carried at least to the point where one drop of the resin solution causes slight turbidity when added to a cold 50% solution of magnesium sulfate ($MgSO_4 \cdot 12\text{-}H_2O$) at a temperature of, say, from 1° to 25°C. However, the degree of condensation should not be so high that the undiluted resin solution begins to show turbidity, i.e. divide into two phases, at temperatures above 60°C, because precipitates already formed are very difficult to remove by adding formaldehyde. Of course, the above-described criteria for the state of the resin solution not only constitute a measure of the degree of condensation but also serve as an indication of the chemical structure of the condensates. However, the complicated and still only little known condensation behavior of many formaldehyde resins is well reproducible and appropriately described by these tests so that the methods are familiar to anyone skilled in the art. The relationship between salt solution compatiblity, water compatibility, temperature and degree of condensation is shown by the tests described below.

The amount of formaldehyde required for the after-treatment in order to convert the high molecular weight resins to stable resins of low viscosity and good impregnating properties, very much depends on the degree of condensation of the resins to be treated. The said amount is greater the more the resins have been precondensed before treatment, i.e. — expressed in terms of the above method of determining the degree of condensation — the lower the degree of compatibility of the resins used with water or salt solution. However, the amount of formaldehyde used in the after-treatment should be such that the total ratio of urea to formaldehyde as calculated from the amounts of resin used in said after-treatment and the added amount of formaldehyde is between 1:2.5 and 1:4 and that at least 0.2 moles of formaldehyde are added per mole of urea. Conveniently, aqueous formaldehyde having a concentration of from 30 to 50% is used. In some cases the formaldehyde source may be a formaldehyde-rich precondensate of urea and formaldehyde having a molar ratio of above 1:3.

The resins obtained by said after-treatment already exhibit the typical impregnating rates and good storage stability, but usually their formaldehyde content is too high for use as impregnating resins. In all cases they can be diluted with hot water and also with at least 20 volumes of water at room temperature to form a clear solution. Following the after-treatment with formaldehyde, further amounts of urea may be added by condensation without impairing the impregnating properties of the resins or their stability. The amount of urea subsequently added by condensation should be such that after condensation the molar ratio of urea to formaldehyde is between 1:1.5 and 1:2.2, i.e. advantageously at least about 0.2 moles of free urea should be added per mole of condensed urea already present.

The process of post-condensation with urea is complete when the free urea has been combined. This is frequently achieved immediately after the resin solution has been heated or, since hot resin solutions will normally be used from the outset, after the urea has been added. It is thus convenient to add the urea in dissolved form, i.e. in aqueous solution.

It will be appreciated that the manufacture of the resin and the after-treatment with formaldehyde and urea may be carried out in any conventional manner. The process may be carried out batchwise or, to particular advantage, continuously — for example in tubular reactors, cascades of stirred reactors and combinations thereof. Depending on the starting solution used and the amounts of formaldehyde and urea added, the impregnating resins produced by the process of the invention have a solids content of from about 40 to 60% by weight. Their viscosity is from 15 to 70 centipoise depending on their concentration. Impregnation is conveniently carried out using solutions which have been diluted to concentrations of from 40 to 50% by weight.

The resins may be used alone or in combination with other resins such as melamine or phenolic resins, in which case the products produced by our process may be blended with the other types of resin in any desired ratio.

Apart from pure urea/formaldehyde condensates it is also possible, to a limited extent, to use modified urea/formaldehyde condensates for our process. Particularly suitable are mixed condensates in which a minor quantity of the urea, for example up to 20% thereof, has been replaced by an equivalent amount of other amino resin-forming or phenolic resin-forming substances such as melamine, phenol and dicyanodiamide. The molar ratios given above then apply according to the combining power of the modifying agent for formaldehyde in relation to that of urea.

The invention is illustrated below with reference to the following Examples, particularly as regards the interrelation of molar ratios, after-treatment times and amounts of substances used for said after-treatment. The impregnating time is determined by causing a flat sheet of light-gray decorative paper weighing 100 g/m² to float on the surface of a resin solution which has been poured into a wide dish and measuring the time for the color of the sheet of paper to turn a uniform dark gray. With some practice this method of determination can be carried out to a reproducible accuracy of less than one half of a second.

TEST

To demonstrate various methods of measuring the degree of condensation, urea and formaldehyde are condensed at the boil starting with molar ratio of urea to formaldehyde of 1:2.0 in approximately 50% solution. The pH is adjusted to 5.5 at the commencement of condensation and drops to 4.5 in the course of the condensation process. After 50 minutes a further amount of urea is added in the form of a concentrated aqueous solution until the molar ratio is 1:1.8.

| Condensation time (min) | Compatibility with Epsom salts (g of $MgSO_4 \cdot 12H_2O$ per 100 ml of soln.) | Compatibility with water (1:5) expressed at temperature at which turbidity occurs (°C) | Water compatibility at reaction temperature |
|---|---|---|---|
| 0 | M.R. 1:2.0 | — | — | — |
| 10 | | — | — | — |
| 20 | | — | — | — |
| 30 | | — | — | — |
| 40 | | 50 | — | — |
| 45 | | 40 | 5 | — |

— Continued

| Condensation time (min) | | Compatibility with Epsom salts (g of MgSO₄·12H 2O per 100 ml of soln.) | Compatibility with water (1:5) expressed at temperature at which turbidity occurs (°C) | Water compatibility at reaction temperature |
| --- | --- | --- | --- | --- |
| 50 + | | 35 | 12 | — |
| 55 | | 30 | 13 | — |
| 60 | M.R. | 25 | 18 | — |
| 65 | 1:1.8 | 20 | 20 | — |
| 70 | | 15 | 25 | 1:8 milky |
| 75 | | 10 | 27 | 1:6 precipitation/1:4.5 milky |
| 80 | | 6 | 29 | 1:4 precipitation |

+ urea added
M.R. = molar ratio

EXAMPLE 1

A 50% aqueous solution of a urea/formaldehyde condensate having a molar ratio of urea to formaldehyde of 1:1.7 is produced at a pH of 4.8 in a number of separate experiments giving products of different degrees of condensation. The degree of condensation is indicated by diluting with 8 volumes of hot water and cooling. In the following table, the expression "turbidity temp." means the temperature at which the dilute sample begins to shown turbidity when cooled in a water bath, as measured with a submerged thermometer having a solid stem. This value is characteristic and reproducible to within about one to two degrees centigrade. Following the after-treatment with formaldehyde and urea, the resin again has a molar ratio of 1:1.7.

during the after-treatment with formaldehyde should not fall below 1:2.5, since at molar ratios below this value the viscosity no longer sinks to the desired extent but on the contrary rises and the impregnating times are lengthened (compare tests Nos. 2, 3 and 4 with test No. 5 or tests Nos. 10, 11 and 12 with test No. 13). In the case of resins showing a high degree of precondensation, the molar ratio 1:2.5 to 1:2.7 is hardly adequate for the conversion of the high molecular weight resins to low molecular weight resins (compare test No. 15 with tests Nos. 16 and 17). It is particularly characteristic of our process that the after-treatment with formaldehyde does not impair but distinctly improves the solidifying time, i.e. the curing rate of the resin solutions when processed. This fact is particularly surprising

TABLE

| Test No. | Degree of condensation turbidity temp. on dilution with 8 vols of water (°C) | M.R. urea formaldehyde during after-treatment with formaldehyde | After-treatment time/temp. [min/°C] | Solidifying time of 50% soln. on adding 10% of 0.5% ammonium chloride soln. [sec] | Impregnating time [sec] | Flow time of 50% soln. from Ford Cup No. 3 at 20°C [sec] |
| --- | --- | --- | --- | --- | --- | --- |
| 1 | 10 | untreated control | | 480 | 9 | 35 |
| 2 | 10 | 1 : 3.10 | | 140 | 1.8 | 28.1 |
| 3 | 10 | 1 : 2.7 | | 165 | 4 | 32.3 |
| 4 | 10 | 1 : 2.5 | | 165 | 10 | 39.2 |
| 5 | 10 | 1 : 2.3 | | 180 | 60 | 75.7 |
| 6 | 20 | untreated control | 60/90 | 595 | 22.8 | 43.1 |
| 7 | 20 | 1 : 4.0 | | 150 | 1.2 | 25.7 |
| 8 | 20 | 1 : 3.5 | | 160 | 1.6 | 27.1 |
| 9 | 20 | 1 : 3.3 | | 180 | 1.8 | 28.5 |
| 10 | 20 | 1 : 3.1 | | 195 | 2.3 | 28.5 |
| 11 | 20 | 1 : 2.7 | | 200 | 7.0 | 37 |
| 12 | 20 | 1 : 2.5 | | 198 | 15.4 | 55.5 |
| 13 | 20 | 1 : 2.3 | | 207 | 55.5 | 100.6 |
| 14 | 40 | untreated control | 60/90 | 275 | 81.8 | 75.8 |
| 15 | 40 | 1 : 3.1 | 60/90 | 113 | 4.0 | 33.7 |
| 16 | 40 | 1 : 2.7 | —/90 | gelled when cooled to 60°C after treatment with formaldehyde | | |
| 17 | 40 | 1 : 2.5 | —/90 | gelled during after-treatment after 45 minutes | | |
| 18 | 10,20,40 | 1 : 2.3 | —/90 | gelled during after-treatment after 15 minutes | | |

The Table shows that to achieve a minimum impregnating time the amount of formaldehyde required for the after-treatment is less the lower the degree of precondensation of the resin.

It is also readily seen from the above Table not only that the after-treatment with formaldehyde lowers the viscosity of the resin solution but also that the impregnating times are improved to an extent which is considerably more than to be expected from the mere change in viscosity (compare test No. 1 with tests Nos. 2 and 3 or test No. 6 with tests Nos. 7 and 11). Thus if follows that the after-treatment with formaldehyde not only lowers the degree of condensation but also causes a basic change in the structure of the condensate. From the data is is seen that the ratio of urea to formaldehyde bearing in mind that a reduction in viscosity hitherto meant prolongation of the curing process.

EXAMPLE 2

1,829 parts by weight of a 65% aqueous urea resin solution (molar ratio 1:1.8) is condensed by heating at pH 6 to such an extent that one volume of the resin solution diluted with eight volumes of hot water shows turbidity when cooled to 22°C. The resulting solution is mixed with 40% formaldehyde solution such that the molar ratio of urea to formaldehyde is then 1:3.1.

This mixture is heated at 90°C with stirring and held at this temperature for 1 hour at a pH of 5.5. The solution is then cooled to 60°C and sufficient urea is added to bring the molar ratio down to the original 1:1.8. The with water to a density of 1.21 g/cm³ and cooled to room temperature.

100 parts by weight of the resulting resin solution are mixed with 3 parts by weight of an adhesive and 0.03 part by weight of ammonium chloride. This mixture is used for impregnating a sheet of cellulose paper weighing 100 g/m² in a bath having a temperature of 20°C. Impregnation is carried to a resin content of 60% of the weight of the paper. The impregnated paper is then treated in an air circulating dryer at a temperature between 130° and 140°C. The amount of volatiles present after drying is 3%. The impregnated sheet is then stuck to a 19 mm thick panel of chipboard using a conventional urea resin glue and a pressure of 8 kg/cm² at 135°C. The resulting laminated chipboard has excellent surface properties.

EXAMPLE 3

2,000 parts by weight of a 60% urea resin solution having a molar ratio of 1:2.0 are condensed at a pH of 5.5 to such an extent that one volume of the resin solution diluted with eight volumes of hot water shows turbidity on cooling to 30°C. 40% formaldehyde is added until the overall ratio of urea to formaldehyde is 1:3.3. This mixture is heated to 85°C with constant stirring and held at that temperature for 75 minutes, the pH being maintained at 5.0 throughout. The mixture is then cooled to 60°C and mixed with urea to give a molar ratio of 1:1.9. At a pH of 5.2, the resulting clear solution is held at 65°C for a further 20 minutes with stirring and then adjusted to neutral pH with dilute caustic soda. Water is then added to give a density of 1.20.

700 parts by weight of the resulting urea resin solution are mixed with 300 parts of a 50% aqueous melamine resin solution having a molar ratio of melamine to formaldehyde of 1:2. At the same time, 2 parts by weight of a urea resin powder are added, the degree of condensation of said powder being such that the resin is no longer soluble but merely swellable. Thus the urea resin powder forms a dispersion of swollen particles in mixture is held at 60°C for a further 15 minutes at a pH of 5.5, whereupon the pH is adjusted to from 7.2 to 7.5 by the addition of caustic soda. The solution is diluted said solution. A piece of soda kraft paper weighing 110 g/m² is impregnated with this mixture. The impregnating equipment is adjusted so as to give a resin pickup of 115% of the dry weight of the paper. The impregnated paper is then dried at 145°C in an air circulating dryer until the amount of volatiles therein is reduced to 5%. There is thus obtained a barrier or underlay film which can be used in processes for finishing chipboard in combination with an appropriately impregnated decorative sheet using pressure and heat in conventional manner.

We claim:

1. A process for the manufacture of impregnating urea/formaldehyde resins, particularly for use in the surface-treatment of wood materials, which comprises:

a. reacting urea and formaldehyde in aqueous acid solution in a molar ratio of from 1:1.5 to 1:2.5 and at a concentration to give a 40 to 70% solids content resin solution, the pH being from 4.5 to 6.5, the reaction being conducted to at least such an extent that a sample of the solution causes turbidity when added dropwise to cold 50% magnesium sulfate solution, but not to an extent exceeding the point at which the resin still remains soluble in the solution at temperatures above 60°C;

b. adding at least 0.2 moles of formaldehyde per mole of urea to obtain a molar ratio of urea to formaldehyde of from 1:2.5 to 1:4 followed by condensing at a temperature of between 40°C and the boiling point of the solution and at a pH of between 3.5 and 9 until the resin solution is capable of being diluted with at least 20 volumes of water at room temperature to form a clear solution; and c. adding urea to give a final molar ratio of urea to formaldehyde of from 1:1.5 to 1:2.5 effecting postcondensation of the mixture of a pH of between 4.0 and 6.5 until all free urea has disappeared.

2. A process as set forth in claim 1, wherein the aftertreatment with formaldehyde is carried out at pH 4.5 to pH 6.5.

* * * * *

UNITED STATES PATENT OFFICE
CERTIFICATE OF CORRECTION

PATENT NO. : 3,896,087
DATED : July 22, 1975
INVENTOR(S) : Friedrich Brunnmueller et al It is certified that error appears in the above-identified patent and that said Letters Patent are hereby corrected as shown below:

Beginning in Column 7, Line 42, and ending in Column 8, Line 2, delete "Mixture is held at 60°C for a further 15 minutes at a pH of 5.5, whereupon the pH is adjusted to from 7.2 to 7.5 by the addition of caustic soda. The solution is diluted said solution."

Signed and Sealed this eighth Day of June 1976

[SEAL]

Attest:

RUTH C. MASON
Attesting Officer

C. MARSHALL DANN
Commissioner of Patents and Trademarks